US009030853B2

(12) United States Patent
Kusunoki et al.

(10) Patent No.: US 9,030,853 B2
(45) Date of Patent: May 12, 2015

(54) POWER CONVERSION EQUIPMENT HAVING A CAPACITOR FAILURE DETECTING CIRCUIT

(75) Inventors: Hironobu Kusunoki, Tokyo (JP); Kenshi Takao, Tokyo (JP); Hiroaki Yamaguchi, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 216 days.

(21) Appl. No.: 13/805,977

(22) PCT Filed: Jun. 25, 2010

(86) PCT No.: PCT/JP2010/004224
§ 371 (c)(1),
(2), (4) Date: Mar. 4, 2013

(87) PCT Pub. No.: WO2011/161730
PCT Pub. Date: Dec. 29, 2011

(65) Prior Publication Data
US 2013/0208516 A1  Aug. 15, 2013

(51) Int. Cl.
*H02H 7/16* (2006.01)
*H02M 5/458* (2006.01)
*H02H 7/12* (2006.01)
*H02P 29/02* (2006.01)

(52) U.S. Cl.
CPC ............ *H02M 5/458* (2013.01); *H02H 7/1216* (2013.01); *H02P 29/02* (2013.01)

(58) Field of Classification Search
CPC ...... H02H 7/1216; H02M 5/458; H02P 29/02
USPC .......................................... 363/34–37; 361/16
See application file for complete search history.

(56) References Cited

U.S. PATENT DOCUMENTS 8,705,214 B2 *  4/2014  Hallak et al. .................... 361/16
2014/0226374 A1 *  8/2014  Hafneer et al. ................ 363/35

FOREIGN PATENT DOCUMENTS

| JP | 08-062270 A | 3/1996 |
| JP | 08-140257 A | 5/1996 |
| JP | 09-224368 A | 8/1997 |
| JP | 11-118860 A | 4/1999 |
| JP | 2006-304414 A | 11/2006 |

* cited by examiner

*Primary Examiner* — Gary L Laxton
*Assistant Examiner* — Kyle J Moody
(74) *Attorney, Agent, or Firm* — Foley & Lardner LLP (57) ABSTRACT

Power conversion equipment which can detect a short circuit failure of series connected smoothing capacitors is provided. The equipment includes a capacitor failure detecting circuit having switch units, exciting resistors, contact resistors, and diodes. A switch unit is provided with an exciting circuit and a contact circuit, and when a predetermined current flows through the exciting circuit, the contact circuit is closed. The exciting circuit and an exciting resistor are alternately connected in series, and the contact circuit and a contact resistor are alternately connected in series. These serially-connected circuits are connected in parallel with each capacitor. When excitation of a switch circuit having a lowest potential is turned OFF, it is judged that one or more of the series connected capacitors has failed via a short circuit.

12 Claims, 5 Drawing Sheets

POWER CONVERSION EQUIPMENT HAVING A CAPACITOR FAILURE DETECTING CIRCUIT

TECHNICAL FIELD

The present invention relates to a power conversion equipment, and more particularly to a power conversion equipment which is provided with a function to detect short circuit failure of a smoothing capacitor circuit.

BACKGROUND ART

Recent power conversion equipment is becoming higher in voltage and growing in size. In addition, equipment requiring capacitors of high voltage and large capacity have come into existence. In such equipment, a large number of capacitors are used by being connected in series, and in parallel. In a case in which the numbers of series connected capacitors and parallel connected capacitors become large, when a capacitor has partially fallen into a short circuit failure state (hereinafter, referred to simply as "failure"), this cannot be detected as a malfunction of the whole equipment, and if usage of the equipment is continued without any trouble-shooting, there may be a case that capacitors have failed one by one continuously, and the malfunction is unnoticed until a large amount of damage occurs. In order to prevent such expanded damage, usually, a capacitor failure detecting circuit is provided.

For this failure detecting circuit, a method for monitoring DC voltage is typically used, but when the numbers of the series connected capacitors and parallel connected capacitors increase, the problem as described above cannot be solved without providing a circuit to monitor voltage of each capacitor individually. Accordingly, a failure detecting circuit might become complicated.

On the other hand, proposals have been made in which intermediate points of the capacitors which are connected in series and parallel are connected by a diode bridge, a level detector to detect a voltage between the DC voltage terminals of the diode bridge is composed, and the failure of the individual capacitors is monitored by checking the output of this level detector (refer to Patent Document 1, for example).

PRIOR ART DOCUMENT

Patent Document

Patent Document 1: Japanese Patent Application Publication No. Hei 8-62270 (Pages 3-4, FIG. 1)

SUMMARY OF THE INVENTION

Problems to be solved by the Invention

The method disclosed in Patent Document 1 rectifies the intermediate points of capacitors by a diode bridge circuit, detects a voltage between DC terminals of the diode bridge circuit by a level detector, and detects whether or not any of the capacitors has failed based on the detection level thereof. It is described that this method can deal with a circuit composed of a large number of capacitors which are connected in series or in parallel, and one detecting circuit is only necessary and can be composed by inexpensive components. But, there is a problem that if the number of the series connected capacitors is not a multiple of 2, the intermediate point cannot be obtained. In addition, if the number of the capacitors which are connected in series and in parallel is large, even if the number of the series connected capacitors is a multiple of 2, since the variation level of the voltage becomes small when a capacitor has failed, there is a problem that the detection thereof becomes difficult and lacks reliability. In addition, there is a problem that when a point of the capacitors connected in series and in parallel is connected to ground or made a neutral point, it becomes difficult to detect the failure.

The present invention is made in view of the above-described problems, and makes it an object to provide a power conversion equipment provided with a failure detecting circuit which can detect failure of a capacitor with high-reliability by a relatively simple circuit, even if a plurality of capacitors are connected in series and in parallel.

Means for Solving the Problem

To achieve the above-described object, according to the present invention, there is provided a power conversion equipment including, a converter to convert an AC voltage of an AC power source into a DC voltage; N (N is an integer not less than 2) capacitors connected in series to smooth the DC voltage which are determined as a first, a second, . . . , a N-th capacitor from a high potential side; and a capacitor failure detecting circuit to detect that any of the N capacitors has failed by short circuit;

wherein the capacitor failure detecting circuit includes: N switch circuits, each of which is provided with an exciting circuit and a contact circuit whose contact is closed by this exciting current, these capacitor failure detecting circuits are determined as a first, a second, . . . , an N-th switch circuit from the high potential side; N exciting resistors which are alternately connected in series with the respective one of the exciting circuits of the N switch circuits; and N contact resistors which are alternately connected in series with the respective one of the contact circuits of the N switch circuits; in the capacitor failure detecting circuit: an end of the exciting circuit and an end of the contact circuit of the first switch circuit are connected to a high potential side of the first capacitor; a connecting point of the first exciting resistor connected to the first switch circuit and the exciting circuit of the second switch circuit is determined as a first connecting point, a connecting point of the first contact resistor connected to the first switch circuit and the contact circuit of the second switch circuit is connected to the first connecting point, and a diode is connected in a direction for flowing current from the first connecting point to a high potential side of the second capacitor; a connecting point of the K-th {K=3, . . . (N−1)} contact resistor connected to the K-th switch circuit and the contact circuit of the (K+1)-th switch circuit is connected to the K-th connecting point, and a K-th diode is connected in a direction for flowing current from the K-th connecting point to a high potential side of the (K+1)-th capacitor, sequentially similarly as described above; and another end of the N-th exciting resistor connected to the N-th switch circuit and another end of the N-th contact resistor connected to the N-th switch circuit are connected to a low potential side of the N-th capacitor; and when excitation of the N-th switch circuit is turned OFF while the converter is operated; the capacitor failure detecting circuit judges that at least one of the N capacitors has failed by short circuit.

Effects of the Invention

According to the present invention, it becomes possible to provide a power conversion equipment provided with a failure detecting circuit which can detect failure of a capacitor with high-reliability by a relatively simple circuit, even if a plurality of capacitors are connected in series and in parallel.

EMBODIMENTS TO PRACTICE THE INVENTION

Hereinafter, embodiments of the present invention will be described with reference to the drawings.

First Embodiment

Figure 2:
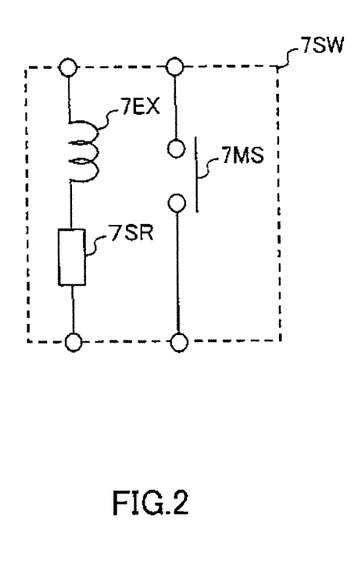
FIG. 2 An internal configuration diagram of the switch circuit of the power conversion equipment according to the first embodiment of the present invention.
Figure 3:
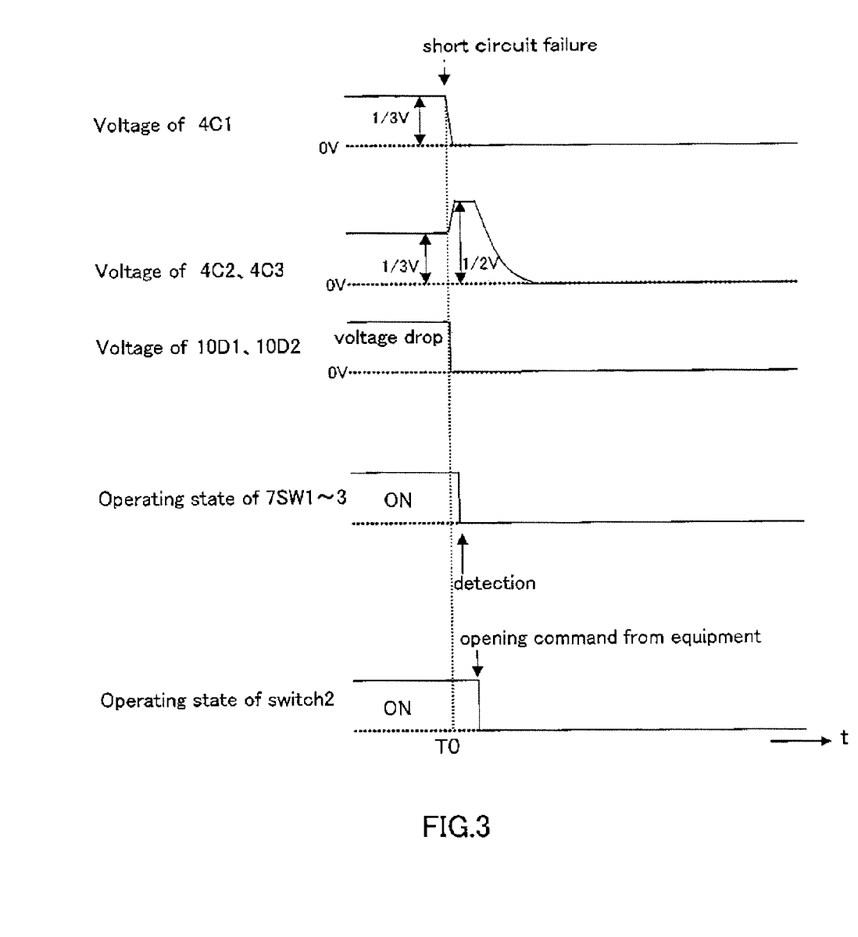
FIG. 3 A time chart to describe the operation of the power conversion equipment according to the first embodiment of the present invention.

Hereinafter, a power conversion equipment according to a first embodiment of the present invention will be described with reference to FIG. 1 to FIG. 3.

Figure 1:
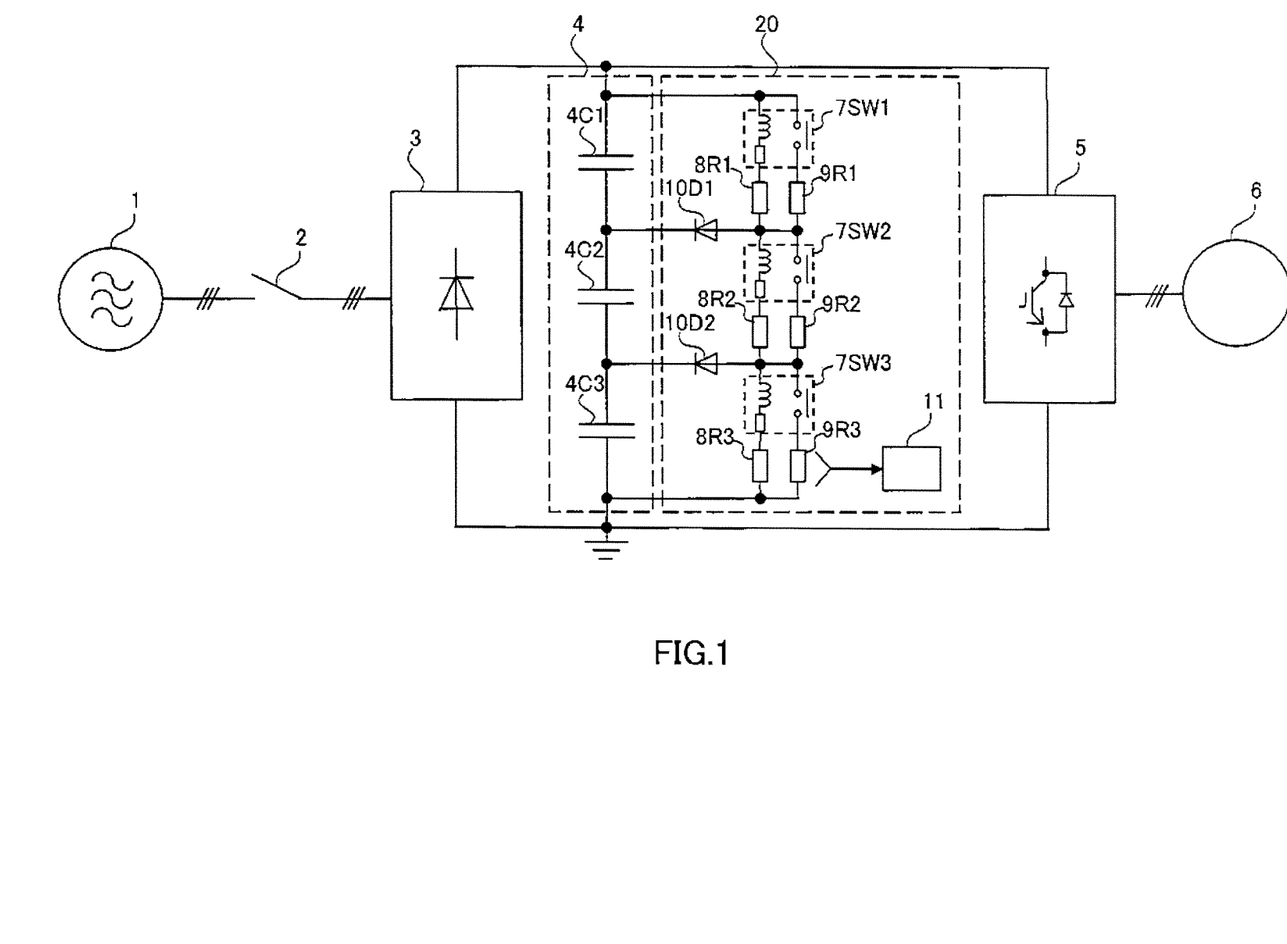
FIG. 1 A circuit configuration diagram of a power conversion equipment according to a first embodiment of the present invention.

FIG. 1 is a circuit configuration diagram of the power conversion equipment according to the first embodiment of the present invention. A three-phase AC power source 1 feeds an AC voltage to a converter 3 through a switch 2. The converter 3 is composed of bridge connected diodes, for example, and converts the AC voltage to a DC voltage. The converter 3 may be a self commutation one using switching devices. This DC voltage is smoothed by a smoothing capacitor circuit 4, and is fed to an inverter 5. The inverter 5 converts the DC voltage into an AC voltage again to drive an AC motor 6.

The smoothing capacitor circuit 4 is composed of capacitors 4C1, 4C2 and 4C3 which are connected in series. A capacitor failure detecting circuit 20 detects that any of the capacitors 4C1, 4C2 and 4C3 has failed. Hereinafter, the internal configuration of the capacitor failure detecting circuit 20 will be described.

The capacitor failure detecting circuit 20 is provided with switch circuits 7SW1, 7SW2 and 7SW3 of the same number as the number of the series connected capacitors of the smoothing capacitor circuit 4. FIG. 2 shows the internal configuration of a switch circuit 7SW having the same configuration as these. As shown in FIG. 2, the switch circuit 7SW is composed of a series circuit (hereinafter, referred to as an exciting circuit) of an exciting coil 7EX and a resistor 7SR which is connected in series to the exciting coil 7EX, and a circuit (hereinafter, referred to as a contact circuit) of a contact 7MS which closes when a current of not less than a predetermined value flows through the exciting coil 7EX.

Both an end of the exciting circuit and an end of the contact circuit of the switch circuit 7SW1 are connected to a high potential end of the capacitor 4C1 (a positive potential end of the converter 3). And, another end of the exciting circuit of the switch circuit 7SW1 is connected to an end of the exciting circuit of the switch circuit 7SW2 through an exciting resistor 8R1 for exciting current regulation, and another end of the contact circuit of the switch circuit 7SW1 is connected to an end of the contact circuit of the switch circuit 7SW2 through a contact resistor 9R1 for sharing voltage. And the end of the exciting circuit of the switch circuit 7SW2 and the end of the contact circuit of the switch circuit 7SW2 are connected to each other, and a diode 10D1 is connected in the direction for flowing current from the connecting point to a high potential end of the capacitor 4C2.

Similarly, another end of the exciting circuit of the switch circuit 7SW2 is connected to an end of the exciting circuit of the switch circuit 7SW3 through an exciting resistor 8R2, and another end of the contact circuit of the switch circuit 7SW2 is connected to an end of the contact circuit of the switch circuit 7SW3 through a contact resistor 9R2. The end of the exciting circuit of the switch circuit 7SW3 and the end of the contact circuit of the switch circuit 7SW3 are connected to each other, and a diode 10D2 is connected in the direction for flowing current from the connecting point to a high potential end of the capacitor 4C3. And both another end of the exciting circuit and another end of the contact circuit of the switch circuit 7SW3 having the lowest potential are connected to a low potential end of the capacitor 4C3 (a negative potential end of the converter 3) through an exciting resistor 8R3 and a contact resistor 9R3, respectively.

A capacitor malfunction detector 11 judges that any of the capacitors 4C1, 4C2 and 4C3 has failed when the voltage between the both ends of the contact resistor 9R3 becomes not more than a predetermined value while the converter 3 is operated.

The above-described configuration shown in FIG. 1 is a case in which the number of the series connected capacitors is three, but even in case that the number of the series connection thereof increases, it is only necessary to make the connection which is similarly as described above. That is, it is only necessary that the connection with respect to the switch circuit 7SW having the highest potential is made the same as the above-described connection of the switch circuit 7SW1, the connection with respect to the switch circuit 7SW having the lowest potential is made the same as the above-described connection of the switch circuit 7SW3, and the connection with respect to all the other switch circuits 7SW is made the same as the above-described connection of the switch circuit 7SW2.

Hereinafter, the operation of the capacitor failure detecting circuit 20 will be described. To begin with, while the converter 3 is operated, if the capacitors 4C1, 4C2 and 4C3 in the smoothing capacitor circuit 4 are all normal, an exciting current flows through each of the exciting circuits of the switch circuits 7SW1, 7SW2 and 7SW3, and thereby each of the contact circuits is closed. For example, a current flowing through the exciting circuit of the switch circuit 7SW1 becomes a value obtained by dividing the voltage applied to the capacitor 4C1 by the sum of the resistor 8R1 and the resistor 7SR.

The state transition when the capacitor 4C1 has failed in this state, and is in the short circuit condition will be described with reference to FIG. 3. As shown in the drawing, it is assumed that the capacitor 4C1 has failed at a time t=T0. The voltage applied to the capacitor 4C1 becomes zero instantly by this failure. As a result, since a current does not come to flow through the exciting circuit of the switch circuit 7SW1, the contact 7MS opens and the contact circuit of the switch circuit 7SW1 is in the open state. Though the voltages applied to the capacitors 4C2 and 4C3 except the failed capacitor 4C1 become about 1.5 times as large as before respectively, since the respective forward voltages of the diodes 10D1 and 10D2 become zero instantly as shown in the drawing, currents do not come to flow through the exciting circuit of the switch circuit 7SW2 and the exciting circuit of the switch circuit 7SW3, and thereby the contact circuits of the switch circuit 7SW2 and the switch circuit 7SW3 are also in the open state. For this reason, while the converter 3 is operated, when the state of the converter 3 changes from the normal state in which the voltage between the both ends of the contact resistor 9R3 exceeds a predetermined voltage to the short circuit state caused by the failure of the capacitor 4C1, since the voltage between the both ends of the contact resistor 9R3 becomes zero, it becomes possible to detect the failure of the capacitor 4C1. This failure signal is taken into the protection sequence of the power conversion equipment to cause the switch 2 of FIG. 1 to be turned OFF, and thereby it becomes possible to prevent the failure expansion to the capacitors 4C2 and 4C3 which are in the overvoltage state. In case that the converter 3 is of a self commutation one, the converter 3 may be gate blocked, in place of turning OFF the switch 2.

When the capacitor 4C2 has failed and is in the short circuit condition, the voltage applied to the capacitor 4C2 becomes zero instantly by this failure. As a result, since a current does not come to flow through the exciting circuit of the switch circuit 7SW2, the contact circuit of the switch circuit 7SW2 is in the open state. In this case, too, a current does not come to flow through the exciting circuit of the switch circuit 7SW3 by the action of the diodes 10D1 and 10D2, and thereby the contact circuit of the switch circuit 7SW3 is also in the closed state.

When the capacitor 4C3 has failed and is in the short circuit condition, the voltage applied to the capacitor 4C3 becomes zero instantly by this failure, and as a result, since a current does not come to flow through the exciting circuit of the switch circuit 7SW3, the contact circuit of the switch circuit 7SW3 is in the open state.

As described above, even if any capacitor has failed by short circuit, a current does not come to flow through the exciting circuit of the switch circuit 7SW3 having the lowest potential. Accordingly, if the state of the switch circuit 7SW3 fitted on the position having the lowest potential is detected by the capacitor malfunction detector 11, it becomes possible to detect the short circuit failure of any one of the capacitors.

As described above, according to the present embodiment, it can be detected with high-reliability that any one of the capacitors which are connected in series has failed by short circuit, and thereby it becomes possible to protect the normal capacitor.

It is possible to use a commercially available inexpensive relay for the switch circuit 7SW. The relay contact 7MS is in an ON state when the coil 7EX of the relay is in the exciting state ("a" contact). Even if the relay contact is a "b" contact, the same detection is enabled. In the case of detecting using this by the same circuit as in FIG. 1, the operation thereof is reversely performed, and when the voltage between the both ends of the contact resistor 9R3, which is zero at the normal time, becomes not less than a predetermined value, it is judged that any one of the capacitors has failed.

It is not necessarily required to detect the voltages between the both ends of the contact resistor 9R3, but it is only necessary to detect the change in the exciting state of the switch circuit 7SW3 fitted on the position having the lowest potential as described above by some kind of method. For example, the voltage of the exciting resistor 8R3 may be detected, and a contact circuit is further provided in the switch circuit 7SW3, and ON OFF state thereof may be detected. Furthermore, a photoelectric conversion element is used in the contact circuit or the exciting circuit, and insulation detection may be performed by light.

Generally, in case that capacitors are connected in series, because variations exist among the capacitances of the respective capacitors, it has been performed that resistors are connected in parallel with the respective capacitors for taking voltage balance among the capacitors. In the case of this first embodiment, it becomes possible to make the exciting resistors 8R1, 8R2 and 8R3 double as the above-described balance resistors. In addition, the contact resistors 9R1, 9R2 and 9R3 may be made to double as the above-described balance resistors.

In FIG. 1, the case has been described assuming that no other capacitors are connected in parallel with the capacitors 4C1, 4C2 and 4C3, respectively, but even if other capacitors are connected in parallel with the respective capacitors, since the capacitor failure detecting circuit 20 functions in the same manner as described above, it becomes possible to detect the short circuit failure of any one of the capacitors.

Second Embodiment

Figure 4:
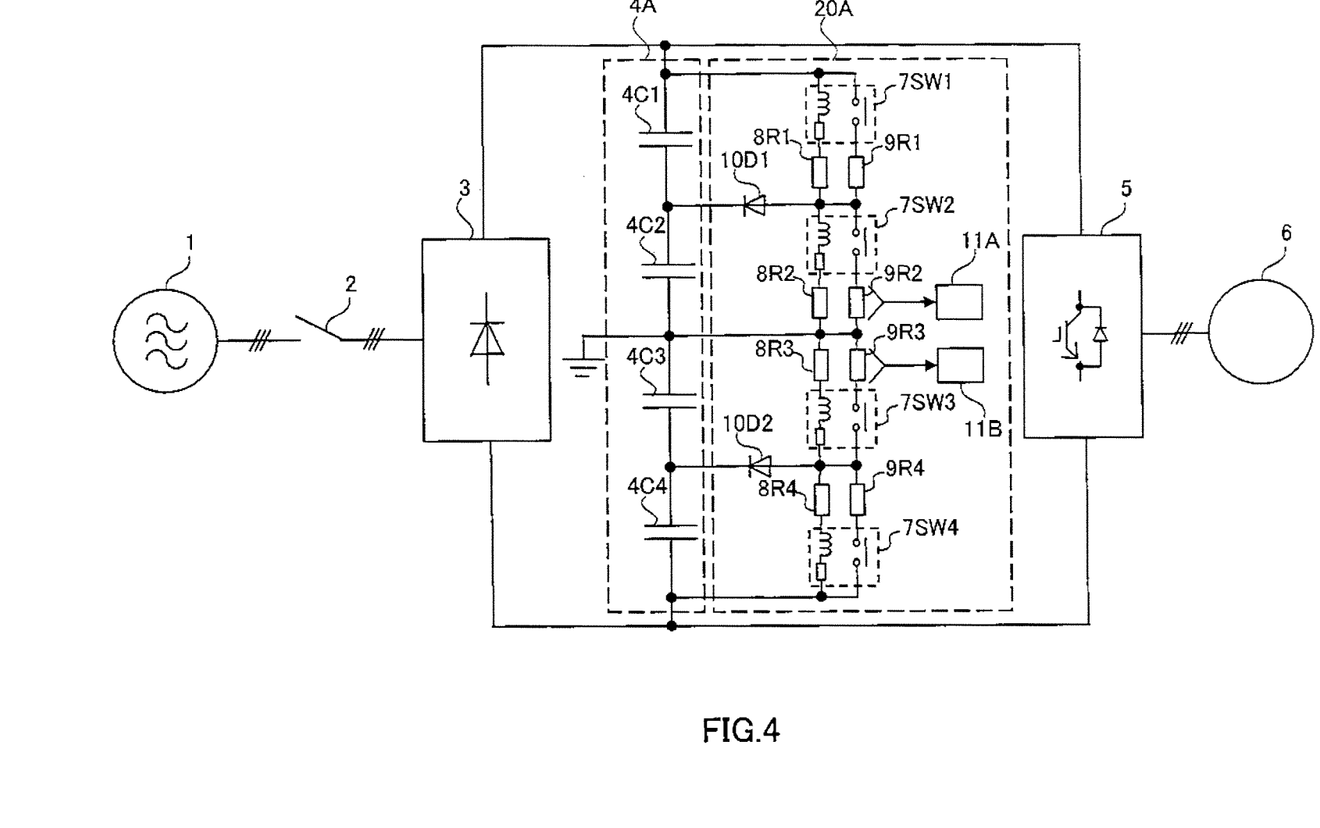
FIG. 4 A circuit configuration diagram of a power conversion equipment according to a second embodiment of the present invention.

FIG. 4 is a circuit configuration diagram of a power conversion equipment according to a second embodiment of the present invention. In the respective portions of this second embodiment, the same portions as the respective portions of the power conversion equipment according to the first embodiment of the present invention of FIG. 1 are indicated by the same symbols, and the description thereof will be omitted. The points in which this second embodiment is different from the first embodiment are: the point that a capacitor circuit 4A is composed of the series connected capacitors 4C1, 4C2, 4C3 and a capacitor 4C4, and the middle point thereof is connected to ground as the neutral point; and the point of the construction in which a capacitor failure detecting circuit 20A is provided with two circuits of a positive side and a negative side using the neutral point as the reference potential, and when the capacitor 4C1 or 4C2 at the positive side has failed, a capacitor malfunction detector 11A at the positive side detects a malfunction thereof, and when the capacitor 4C3 or 4C4 at the negative side has failed, a capacitor malfunction detector 11B at the negative side detects a malfunction thereof. Accordingly, with respect to the configuration of the capacitor failure detecting circuit 20A, for the capacitors 4C1 and 4C2 a the positive side, it is the same configuration as the capacitor failure detecting circuit 20 of the first embodiment, and for the capacitors 4C3 and 4C4 at the negative side, it is the same configuration as the capacitor failure detecting circuit 20 of the first embodiment in which the direction of the voltage is reversed.

In this case, too, when the capacitor 4C4 at the negative side has failed and is in the short circuit condition, the voltage applied to the capacitor 4C4 becomes zero instantly by this failure. As a result, since a current does not come to flow through the exciting circuit of the switch circuit 7SW4, the contact circuit of the switch circuit 7SW4 is in the open state. And, a current does not come to flow through the exciting circuit of the switch circuit 7SW3 by the action of the diode 10D2, and thereby the contact circuit of the switch circuit 7SW3 is also in the closed state. Accordingly, the voltage of the contact resistor 9R3 becomes zero, and thereby it becomes possible to detect the malfunction by the capacitor malfunction detector 11B. Since the operation in case that other capacitors have failed is fundamentally the same as in the case of the first embodiment, the description thereof will be omitted.

The failure signal of the capacitor malfunction detector 11A or 11B is taken into the protection sequence of the power conversion equipment to cause the switch 2 of FIG. 4 to be turned OFF, and thereby it becomes possible to prevent the failure expansion to the smoothing capacitors which are in the overvoltage state in the same manner as in the case of the first embodiment.

Third Embodiment

Figure 5:
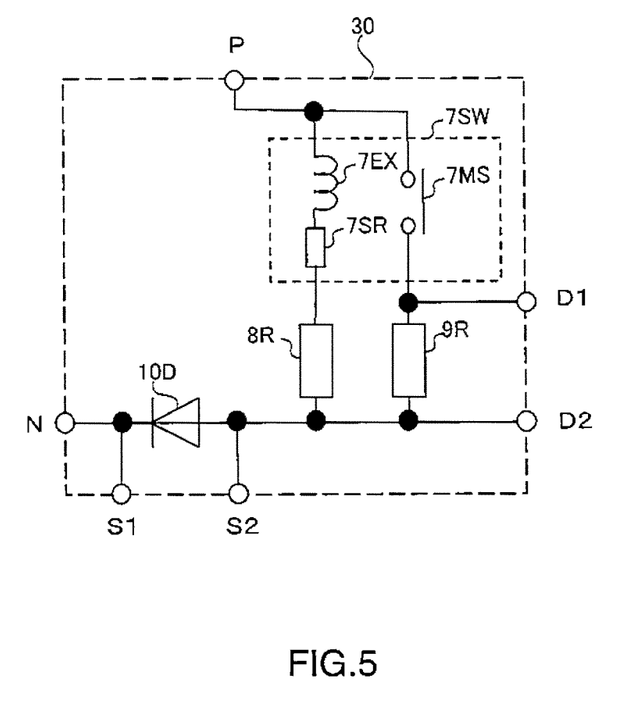
FIG. 5 A circuit configuration diagram of a standardized unit for a capacitor failure detecting circuit used in a power conversion equipment according to a third embodiment of the present invention.

FIG. 5 is a circuit configuration diagram of a standardized unit for a capacitor failure detecting circuit which is used in a power conversion equipment according to a third embodiment of the present invention. If a standardized unit 30 in which the switch circuit 7SW, a resistor 8R, a resistor 9R and a diode 10D are fitted as shown in the drawing is prepared, it is possible to easily assembly the capacitor failure detecting circuits 20, 20A respectively shown in the first embodiment and the second embodiment by combining these standardized units 30.

The terminal configuration of the standardized unit is composed of as follows: a point where an end of the exciting circuit and an end of the contact circuit of the switch circuit 7SW are connected to each other is made a terminal P; the both ends of the contact resistor 9R are respectively made terminals D1 and D2; a cathode side of the diode 10D is made a terminal N; and the both ends of the diode 10D are respectively made terminals S1, S2. As shown in the drawing, the terminal D2 and the terminal S2 are the same connecting point, and the terminal N and the terminal S1 are the same connecting point. The terminals D1, D2 are provided as the terminals for voltage detection, and the terminals S1, S2 are provided so that the standardized unit can be applied to the switch circuit 7SW3 at the position having the lowest potential described in FIG. 1, and are the terminals to short the diode 10D.

In the above-description, since the terminals D1, S1 and S2 are not used in the standardized unit in which the switch circuit 7SW1 or 7SW2 is fitted, as the standardized unit, the capacitor failure detecting circuit is composed of the standardized units with the three terminals of only the terminal P, the terminal D2 and the terminal N, and another unit not having the diode 10D may be applied to the position having the lowest potential.

As described above, when the standardized units 30 of FIG. 5 are used, not only the mass productivity thereof is high, but also the economic efficiency thereof becomes extremely good, because all of the components thereof can be composed of low voltage components.

DESCRIPTION OF THE SYMBOLS

1 AC power source
2 switch
3 converter
4 smoothing capacitor circuit
4C1, 4C2, 4C3 capacitor
5 inverter
6 AC motor
7SW, 7SW1, 7SW2, 7SW3, 7SW4 switch circuit
8R, 8R1, 8R2, 8R3, 8R4 exciting resistor
9R, 9R1, 9R2, 9R3, 9R4 contact resistor
10D, 10D1, 10D2, 10D3, 10D4 diode
11, 11A, 11B capacitor malfunction detector
20, 20A capacitor failure detecting circuit
30 standardized unit

The invention claimed is:

1. Power conversion equipment, comprising:
a converter to convert an AC voltage of an AC power source into a DC voltage;
N capacitors connected in series to smooth the DC voltage which are determined as a first, a second, . . . , an N-th capacitor from a high potential side, wherein N is an integer not less than 2; and
a capacitor failure detecting circuit to detect that any of the N capacitors has failed by short circuit;
wherein the capacitor failure detecting circuit includes:
    N switch circuits, each of which is provided with an exciting circuit and a contact circuit whose contact is closed by exciting current, the N switch circuits being determined as a first, a second, . . . , an N-th switch circuit from the high potential side;
    N exciting resistors which are alternately connected in series with a respective exciting circuit of the N switch circuits; and
    N contact resistors which are alternately connected in series with a respective contact circuit of the N switch circuits;
wherein, in the capacitor failure detecting circuit:
    an end of the exciting circuit and an end of the contact circuit of a first switch circuit are connected to a high potential side of a first capacitor;
a connecting point of a first exciting resistor connected to the first switch circuit and an exciting circuit of a second switch circuit is determined as a first connecting point, a connecting point of a first contact resistor connected to the first switch circuit and a contact circuit of the second switch circuit is connected to the first connecting point, and a diode is connected in a direction for flowing current from the first connecting point to a high potential side of a second capacitor;
a connecting point of a K-th {K=2, 3, . . . (N−1)} contact resistor connected to a K-th switch circuit and a contact circuit of a (K+1)-th switch circuit is connected to a K-th connecting point, and a K-th diode is connected in a direction for flowing current from the K-th connecting point to a high potential side of a (K+1)-th capacitor, in a sequential manner;
another end of an N-th exciting resistor connected to an N-th switch circuit and another end of an N-th contact resistor connected to the N-th switch circuit are connected to a low potential side of an N-th capacitor; and
when excitation of the N-th switch circuit is turned OFF while the converter is operated, the capacitor failure detecting circuit judges that one or more of the N capacitors has failed by short circuit.

2. The power conversion equipment according to claim 1, wherein the capacitor failure detecting circuit judges that one or more of the N capacitors has failed by short circuit when a voltage between both ends of an N-th contact resistor out of the N contact resistors becomes not more than a predetermined value.

3. The power conversion equipment according to claim 2, wherein when the capacitor failure detecting circuit detects malfunction, a switch provided at an input side of the converter is made to be turned OFF, or the converter is made to be gate blocked.

4. The power conversion equipment according to claim 2, wherein:
the capacitor failure detecting circuit comprises standardized units;
each of the standardized units uses a switch circuit of the N switch circuits, an exciting resistor of the N exciting resistors, a contact resistor of the N contact resistors and the diode, which are respectively composed of one piece; and in each of the standardized units, an end of the exciting circuit and an end of the contact circuit of the switch circuit are connected to make a first terminal, an end of the exciting resistor is connected to another end of the exciting circuit to make another end of the exciting resistor a second terminal, the contact resistor is connected between another end of the contact circuit and the second terminal, and the diode is connected in a direction for flowing current from the second terminal to make the another end of the contact circuit a third terminal.

5. The power conversion equipment according claim 1, wherein when the capacitor failure detecting circuit detects malfunction, a switch provided at an input side of the converter is made to be turned OFF, or the converter is made to be gate blocked.

6. The power conversion equipment according to claim 5, wherein:

the capacitor failure detecting circuit comprises standardized units;

each of the standardized units uses a switch circuit of the N switch circuits, an exciting resistor of the N exciting resistors, a contact resistor of the N contact resistors and the diode, which are respectively composed of one piece; and in each of the standardized units, an end of the exciting circuit and an end of the contact circuit of the switch circuit are connected to make a first terminal, an end of the exciting resistor is connected to another end of the exciting circuit to make another end of the exciting resistor a second terminal, the contact resistor is connected between another end of the contact circuit and the second terminal, and the diode is connected in a direction for flowing current from the second terminal to make the another end of the contact circuit a third terminal.

7. The power conversion equipment according to claim 1, wherein:

the capacitor failure detecting circuit comprises standardized units;

each of the standardized units uses a switch circuit of the N switch circuits, an exciting resistor of the N exciting resistors, a contact resistor of the N contact resistors and the diode, which are respectively composed of one piece; and in each of the standardized units, an end of the exciting circuit and an end of the contact circuit of the switch circuit are connected to make a first terminal, an end of the exciting resistor is connected to another end of the exciting circuit to make another end of the exciting resistor a second terminal, the contact resistor is connected between another end of the contact circuit and the second terminal, and the diode is connected in a direction for flowing current from the second terminal to make the another end of the contact circuit a third terminal.

8. The power conversion equipment according to claim 7, wherein:

in each of the standardized units, a fourth terminal is provided at a connecting point of the contact circuit and the contact resistor, and a fifth terminal and a sixth terminal are provided at both ends of the diode.

9. Power conversion equipment, comprising:

a converter to convert an AC voltage of an AC power source into a DC voltage;

2N capacitors connected in series to smooth the DC voltage which are defined as a first, a second, . . . , a 2N-th capacitor from a high potential side, and whose neutral point is connected to ground; and a capacitor failure detecting circuit to detect that any of the 2N capacitors has failed, N being an integer not less than 2, wherein:

the capacitor failure detecting circuit includes a malfunction detecting circuit for N capacitors at a positive side and a malfunction detecting circuit for N capacitors at a negative side;

the malfunction detecting circuit for the N capacitors at the positive side has a first configuration comprising:

N switch circuits, each of which is provided with an exciting circuit and a contact circuit whose contact is closed by exciting current, the N switch circuits being determined as a first, a second, . . . , an N-th switch circuit from the high potential side;

N exciting resistors which are alternately connected in series with a respective exciting circuit of the N switch circuits; and N contact resistors which are alternately connected in series with a respective contact circuit of the N switch circuits, wherein an end of the exciting circuit and an end of the contact circuit of a first switch circuit are connected to a high potential side of a first capacitor; a connecting point of a first exciting resistor connected to the first switch circuit and an exciting circuit of a second switch circuit is determined as a first connecting point, a connecting point of a first contact resistor connected to the first switch circuit and a contact circuit of the second switch circuit is connected to the first connecting point, and a diode is connected in a direction for flowing current from the first connecting point to a high potential side of a second capacitor;

wherein a connecting point of a K-th {K=2, 3, . . . (N−1)} contact resistor connected to a K-th switch circuit and a contact circuit of the (K+1)-th switch circuit is connected to a K-th connecting point, and a K-th diode is connected in a direction for flowing current from the K-th connecting point to a high potential side of a (K+1)-th capacitor in a sequential manner;

wherein another end of an N-th exciting resistor connected to an N-th switch circuit and another end of an N-th contact resistor connected to the N-th switch circuit are connected to a low potential side of an N-th capacitor; and wherein when excitation of the N-th switch circuit is turned OFF while the converter is operated, the malfunction detecting circuit for the N capacitors judges that one or more of the N capacitors has failed by short circuit; and wherein the malfunction detecting circuit for the N capacitors at the negative side has a second configuration corresponding to the first configuration but in which a polarity of a voltage is reversed.

10. The power conversion equipment according to claim 9, wherein the capacitor failure detecting circuit judges that one or more of the N capacitors has failed by short circuit when a voltage between both ends of an N-th contact resistor out of the N contact resistors becomes not more than a predetermined value.

11. The power conversion equipment according to claim 9, wherein when the capacitor failure detecting circuit detects malfunction, a switch provided at an input side of the converter is made to be turned OFF, or the converter is made to be gate blocked.

12. The power conversion equipment according to claim 9, wherein:

the capacitor failure detecting circuit comprises standardized units;

each of the standardized units uses a switch circuit of the N switch circuits, an exciting resistor of the N exciting resistors, a contact resistor of the N contact resistors and the diode, which are respectively composed of one piece; and in each of the standardized units, an end of the exciting circuit and an end of the contact circuit of the switch circuit are connected to make a first terminal, an end of the exciting resistor is connected to another end of the exciting circuit to make another end of the exciting resistor a second terminal, the contact resistor is connected between another end of the contact circuit and the second terminal, and the diode is connected in a direction for flowing current from the second terminal to make the another end of the contact circuit a third terminal.

\* \* \* \* \*